United States Patent
Heuser et al.

(10) Patent No.: US 7,322,769 B2
(45) Date of Patent: Jan. 29, 2008

(54) BALL AND SOCKET JOINT

(75) Inventors: Frank Heuser, Neerstedt (DE); Frank Budde, Damme (DE)

(73) Assignee: ZF Lemförder MetallWaren AG (DE)

( * ) Notice: Subject to any disclaimer, the term of this patent is extended or adjusted under 35 U.S.C. 154(b) by 566 days.

(21) Appl. No.: 10/380,612

(22) PCT Filed: Jul. 16, 2002

(86) PCT No.: PCT/DE02/02600

§ 371 (c)(1),
(2), (4) Date: Mar. 13, 2003

(87) PCT Pub. No.: WO03/016731

PCT Pub. Date: Feb. 27, 2003

(65) Prior Publication Data
US 2003/0180089 A1 Sep. 25, 2003

(30) Foreign Application Priority Data
Jul. 25, 2001 (DE) ................................. 101 35 386

(51) Int. Cl.
*F16C 11/00* (2006.01)
(52) U.S. Cl. ...................... 403/142; 403/133; 403/135; 403/141; 403/143
(58) Field of Classification Search .............. 403/133, 403/135, 122, 141, 142, 143; 384/297–300
See application file for complete search history.

(56) References Cited

U.S. PATENT DOCUMENTS 2,757,109 A * 7/1956 Martello .................... 384/297
3,094,376 A * 6/1963 Thomas ..................... 403/140
3,486,778 A * 12/1969 Herbenar et al. ........... 403/140
3,507,527 A * 4/1970 White ..................... 403/140 X
3,647,249 A * 3/1972 Baba et al. ................. 403/140
3,693,999 A * 9/1972 Wood, Jr. ............... 403/133 X
3,950,006 A * 4/1976 Wood, Jr. ............... 403/133 X
4,231,673 A * 11/1980 Satoh et al. ................. 403/135
4,324,501 A * 4/1982 Herbenar .................... 403/133
4,564,307 A * 1/1986 Ito .......................... 403/133 X
4,577,989 A * 3/1986 Ito .......................... 403/135 X
4,691,422 A * 9/1987 Tilgner et al. ......... 403/122 X
5,092,703 A 3/1992 Kobayashi (Continued)

FOREIGN PATENT DOCUMENTS

DE 1 469 973 A 3/1969

(Continued)

Primary Examiner—Daniel P. Stodola
Assistant Examiner—Michael P. Ferguson
(74) Attorney, Agent, or Firm—McGlew & Tuttle P.C.

(57) ABSTRACT

A ball-and-socket joint for a motor vehicle, and especially for the chassis of the motor vehicle, with a ball-and-socket joint housing is provided with a joint opening (6), in which housing there is arranged a bearing shell (5). The ball-and-socket joint has a ball pivot (3) with a pin (2) and with a joint ball (1), which is rotatably and pivotably mounted in the bearing shell (5), in which case the pin extends out of the ball-and-socket joint housing (4) through the bearing shell (5) and the joint opening (6). The bearing shell (5) is made at least partially of a plastic mixed with an anti-adhesive material and reinforced with fibers.

25 Claims, 3 Drawing Sheets

U.S. PATENT DOCUMENTS

| | | | |
|---|---|---|---|
| 5,416,154 A * | 5/1995 | Ferdani | |
| 5,704,727 A * | 1/1998 | Atkins et al. | 403/135 |
| 5,795,092 A * | 8/1998 | Jaworski et al. | 403/133 X |
| 5,885,022 A * | 3/1999 | Maughan et al. | 403/135 |
| 5,904,436 A * | 5/1999 | Maughan et al. | 403/135 X |
| 6,019,541 A * | 2/2000 | Maughan | 403/135 X |
| 6,042,293 A * | 3/2000 | Maughan | 403/135 |
| 6,082,923 A * | 7/2000 | Maughan | 403/135 |
| 6,213,675 B1 * | 4/2001 | Ungruh et al. | 403/135 |
| 6,254,114 B1 * | 7/2001 | Pulling et al. | 403/135 X |

FOREIGN PATENT DOCUMENTS

| | | |
|---|---|---|
| DE | 1 947 236 A | 4/1971 |
| DE | 32 22 308 A1 | 1/1983 |
| DE | 41 08 219 | 9/1992 |
| DE | 41 08 219 A1 | 9/1992 |
| DE | 297 22 507 | 4/1999 |
| DE | 199 32 789 | 1/2001 |
| EP | 0 411 777 B1 | 2/1991 |
| EP | 0 900 677 A | 3/1999 |

* cited by examiner

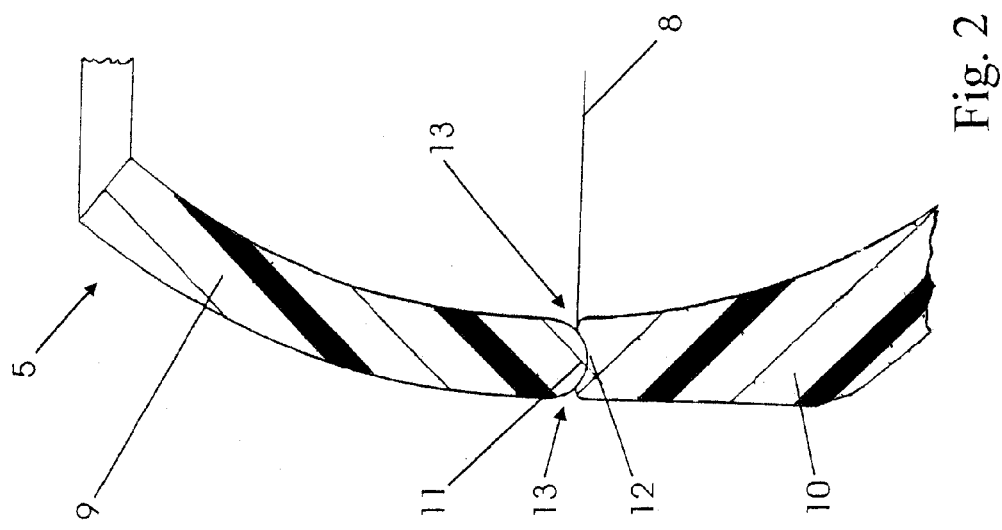
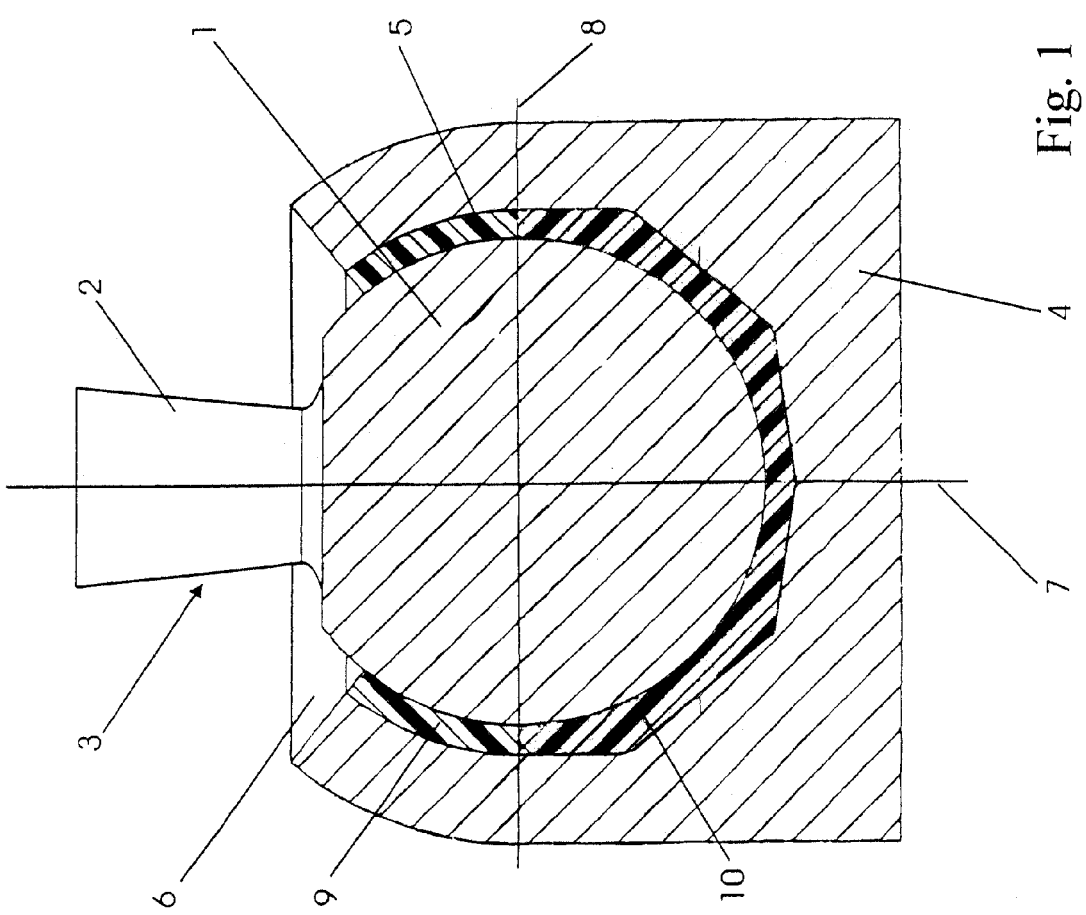

BALL AND SOCKET JOINT

FIELD OF THE INVENTION

The present invention pertains to a ball-and-socket joint for a motor vehicle, and especially for the chassis of the motor vehicle, with a ball-and-socket joint housing provided with a joint opening, a bearing shell arranged in this housing, a ball pivot having a joint ball and a pin, which is mounted with its joint ball rotatably and pivotably in the bearing shell and projects from the ball-and-socket joint housing with its pin through the bearing shell and the joint opening.

BACKGROUND OF THE INVENTION

Such a ball-and-socket joint has become known from DE 297 22 507 U1, in which the bearing shell is made of a fiber-reinforced plastic. Plastics reinforced with fibers have a markedly higher strength compared with the same plastic that is not reinforced with fibers. This markedly higher strength is also desired to increase the life of ball-and-socket joints. However, the ends of the fibers projecting on the surface in fiber-reinforced plastics, which erode the surface of the joint ball, among other things, and cause an increased friction between the joint ball and the bearing shell, are problematic.

It has become known to manufacture a bearing shell from polyamide with a 30% glass fiber content and 6% graphite from DE 199 32 789 A1, which discloses a ball-and-socket joint for installation in a drive device for windshield wiper units. By using a bearing shell made of a graphite-lubricated thermoplast, whose application is well known in water environments, the friction was reduced and the wear of the surface of the joint ball was reduced. Even so, the wear and the friction in this ball-and-socket joint are too high, if it is to be used, e.g., in the chassis of a motor vehicle. Further, a water environment in the interior of a ball-and-socket joint to be used in the chassis is undesirable.

SUMMARY OF THE INVENTION

The object of the present invention is to create a ball-and-socket joint for a motor vehicle provided with a bearing shell made of fiber-reinforced plastic, whereby, with moisture excluded, the friction between the joint ball and the bearing shell as well as the wear of the joint ball surface are further reduced.

According to the invention, a ball-and-socket joint for a motor vehicle is provided especially for the chassis of the motor vehicle with a ball-and-socket joint housing provided with a joint opening, in which a bearing shell is arranged. The ball-and-socket joint has a ball pivot with a pin and a joint ball that is mounted rotatably and pivotably in the bearing shell, whereby the pin extends out of the ball-and-socket joint housing through the bearing shell and the joint opening. The bearing shell is at least partially made of a plastic mixed with a friction-modifying, anti-adhesive material and reinforced with fibers.

By adding the function-modifying, anti-adhesive material to the fiber-reinforced plastic, the friction between the bearing shell and the joint ball and the wear of the surface of the joint ball are markedly reduced. Because of its anti-adhesive property, the anti-adhesive material has not only a lubricating action, but, at the same time, serves as a spacer between the ends of the fibers projecting from the surface of the plastic and the joint ball. As a result of this, a markedly smaller coefficient of friction and a lower wear factor are achieved than in the fiber-reinforced plastics lubricated with graphite, because, other than the graphite which, because of its layer lattice structure, brings about lubrication by different layers of the layer lattice structure sliding in relation to one another with the breakdown of a graphite particle, the lubricating action of an anti-adhesive material is based on surface-related rather than volume-related properties, such that the lubricating action can be achieved even without the breakdown of anti-adhesive material particles, which may thus at the same time serve as spacers and as lubricants.

Depending on the range of application of a ball-and-socket joint provided with a bearing shell, the local loads of the bearing shell are different, such that, in the ball-and-socket joint according to the present invention, especially the areas of the bearing shell, on which the greatest pressures are exerted in the operation of the ball-and-socket joint according to the present invention, are made of the plastic mixed with an anti-adhesive material.

The anti-adhesive material may be produced, e.g., by using halides. Because of their high valence electron density, these may promote the desired anti-adhesive property. Fluorine compounds, e.g., PFA (perfluoroalkoxy copolymer) or PTFE (polytetrafluoroethylene) have especially proven to be suitable. According to a preferred embodiment, however, PTFE is used as the anti-adhesive material since it has one of the lowest coefficients of friction.

As the plastic materials for the bearing shell, e.g., PEEK (polyether ether ketone), PES (polyether sulfone), PSU (polysulfone), PEI (polyether imide) or PPS (polyphenylene sulfide) may be used, in which case all these materials have a high strength. However, according to a preferred embodiment, polyamide, which is a material well known in terms of strength requirements and at the same time favorable in terms of cost, is used as the plastic material.

As the fibers, e.g., the especially light carbon fibers or aramide fibers which have a good lubricating action may be used. However, glass fibers are preferably used for reinforcing the plastic, since with these a relatively great reinforcement of the plastic material can be achieved at a low cost.

The fiber-reinforced plastic used has a higher strength but also a higher brittleness. According to an embodiment of the ball-and-socket joint according to the present invention, a plurality of slots that run in the longitudinal direction of the ball bearing and are bordered on one side are, for this reason, provided in the wall of the edge area of the bearing shell facing towards the pin, so that the bearing shell can deform under external pressure without breaking down or tear formation and can adapt to the area of the joint ball facing towards the pin.

By introducing a lubricant into the interior of the ball-and-socket joint, the friction between the bearing shell and the joint ball can be further reduced. Therefore, not only is a lubricant preferably introduced into the ball-and-socket joint, but also lubricating grooves or grease pockets are provided in the area of the bearing shell facing towards the joint ball, which, as a lubricant reservoir, support the maintenance of a lubricating film between the joint ball and the bearing shell.

The bearing shell may have a one-piece design, in which a slot running in the longitudinal direction of the ball-and-socket joint is preferably designed in the wall of the one-piece bearing shell, so that the joint ball can be introduced into the interior of the bearing shell through a pin opening provided for the pin and designed in the bearing shell upon widening of the slot. The embodiment of this slot is desirable, since the pin opening usually has a smaller diameter than the joint ball.

However, the bearing shell may also be divided into two separate partial shells, whereby a first of the two partial shells is arranged between the area of the joint ball facing towards the joint opening and the ball-and-socket joint housing, and the second partial shell is arranged between the area of the joint ball facing away from the joint opening and the ball-and-socket joint housing. In this case, the area of the joint ball facing towards the joint opening is defined as the area that lies between the meridian plane defined on the joint ball by the large circle running at right angles to the longitudinal axis of the ball-and-socket joint and the joint opening. As a result, the area of the joint ball facing away from the joint opening lies in the half-space defined by the meridian plane and facing away from the joint opening.

Because of the pin opening provided in the first partial shell for the pin, the bearing area of the first partial shell that is active in the axial direction is markedly reduced. For this reason, an axial force, acting on the joint ball and directed towards the pin, brings about a markedly higher pressure on the first partial shell than the force, equal in terms of quantity, with opposed orientation on the second partial shell, which has a greater active bearing surface than the first partial shell. Therefore, the first partial shell is preferably made of the plastic mixed with a friction-modifying, anti-adhesive material and reinforced with fibers.

If the first partial shell is completely made of plastic that is mixed with anti-adhesive material and is reinforced with fibers, then the first partial shell can be made as a cost-favorable injection-molded part, without having to use an expensive two-component process.

The first partial shell can be mounted by the ball pivot being guided from the bearing surface side of the bearing shell with its pin through the pin opening provided for it in the first partial shell. A slot running in the longitudinal direction of the ball-and-socket joint is, however, preferably provided in the wall of the first partial shell, such that a mounting of the ball pivot with its joint ball through the pin opening provided for the pin in the first partial shell upon widening of this slot is possible.

The second partial shell may be made of the same material as the first partial shell. However, the second partial shell is preferably made of a material that is more ductile and more elastic than the first partial shell, such that shock loads acting on the second partial shell can be absorbed. This property of the second partial shell increases, e.g., the passenger comfort in a ball-and-socket joint arranged in the chassis. If the ball-and-socket joints is further mounted under pressure, then the spring-elastic property of the second partial shell is additionally used to pretension the joint ball with a sufficient pretension against the first partial shell. As a result, for example, a rattling caused by the wear of the partial shells can be opposed.

The spring-elastic effect mentioned above may also be created or improved in that an elastomer ring is arranged between the second partial shell and the ball-and-socket joint housing under pretension.

POM (polyoxymethylene), which has the desired more ductile and more elastic properties, has been proven to be especially suitable as a material for the second partial shell. For this reason the second partial shell is preferably made of POM.

If the first partial shell is not in contact with the second partial shell, this can be moved in the ball-and-socket joint housing by pivoting the ball pivot because of the frictional forces between the joint ball and the first partial shell. This behavior is undesirable and leads to additional wear, so that the first partial shell is in contact with the second partial shell according to a preferred embodiment. At the contact point of the first and second partial shells, the two partial shells are supported against one another, such that at least in this respect a movement of the two partial shells on one another is very certainly prevented. An especially good securing of the two partial shells against tipping over is achieved in that these partial shells are in contact completely along their two edges facing each other or at least at a plurality of points arranged distributed all around the circumference of the joint ball.

Process tolerances frequently occur in the manufacture of the plastic molded parts, which may lead to undesired properties of the ball-and-socket joint. For this reason, the edge of the first partial shell facing towards the second partial shell has a convex design and the edge of the second partial shell facing towards the first partial shell has a concave design, so that, in case of a too large shape of one of the partial shells or both partial shells, the relatively hard first partial shell with its convex edge surface presses into the concave edge surface of the relatively soft second partial shell, as a result of which the first partial shell can penetrate in the edge area of the second partial shell. In this process, the first partial shell is pressed onto the second partial shell under displacement of the material of the second partial shell until a tolerance-free seating of the two partial shells is achieved in the ball-and-socket joint housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view of a first embodiment of the ball-and-socket joint according to the present invention with a bearing shell divided into two partial shells;

FIG. 2 is a sectional view of a part of the two-part bearing shell according to FIG. 1 in the contact area of the two partial shells;

DESCRIPTION OF THE PREFERRED EMBODIMENTS

Figure 3:
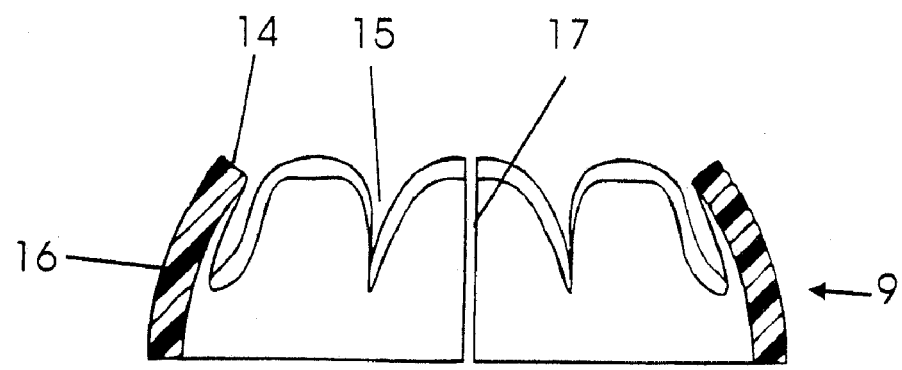
FIG. 3 is a sectional view of a first of the two partial shells according to FIG. 1.

Referring to the drawings in particular, FIG. 1 shows a first embodiment of the ball-and-socket joint according to the present invention, in which a ball pivot 3 provided with a joint ball 1 and a pin 2 is rotatably and pivotably mounted with its joint ball 1 in a bearing shell 5 arranged in a ball-and-socket joint housing 4. A sealing bellows, which is not shown here for the sake of clarity, may be provided between the ball-and-socket joint housing 4 and the pin 2.

The bearing shell 5 is divided along the meridian plane 8 of the joint ball 1 running at right angles to the longitudinal axis 7 of the ball-and-socket joint into a first partial shell 9 and into a second partial shell 10. The first partial shell 9 has a ring-shaped design and is made of polyamide mixed with PTFE and reinforced with glass fibers. In order to achieve a good strength, on the one hand, and a good sliding property, on the other hand, the fiber content in the polyamide is from 20% to 50% and the PTFE content is from 5% to 20%. The first partial shell 9, because of its high strength, is susceptible only to a slight creeping of the material even at higher temperatures of, e.g., 80° C. to 120° C.

The second partial shell 10 has a semicircular-shell-shaped design and it is made of POM, in which case the material properties of POM give the second partial shell 10 good resilience and absorption properties.

FIG. 2 shows a partial cutaway view of the bearing shell 5 according to a first embodiment in the area, in which the first partial shell 9 is on the second partial shell 10. The first partial shell 9 has a convex shape on its edge 11 facing towards the second partial shell 10 and meshes with the edge 12 of the second partial shell 10, which faces towards the first partial shell 9 and has a concave shape. In the contact area of the two partial shells 9 and 10, a material-free area 13 each is provided on the inside and on the outside of the bearing shell 5, into which material of the second partial shell 10 can flow, if the first partial shell 9 with its convex edge 11 presses against the concave edge 12 of the second partial shell 10.

FIG. 3 shows a sectional view of the first partial shell 9 according to the first embodiment, in which a plurality of slots 15 running in the longitudinal direction of the ball-and-socket joint and bordered on one side, which have a v-shaped design here, but may also have another shape, are provided in the wall 16 of the edge area facing towards the pin 2 all around the pin opening 14 that is provided for the pin 2 in the first partial shell 9. Because of process tolerances, the first partial shell 9, which is already designed as bent with respect to its cross section, is not always completely on the surface of the joint ball 1. By providing the slots 15, the edge area of the first partial shell 9 facing towards the pin 2 can now be pressed against the joint ball 1 during the mounting of the ball-and-socket joint, without causing a tear formation or breakdown of the first partial shell 9, because the slots 15 give the edge area of the first partial shell facing towards the pin a higher elasticity, in which case the elastic area or the tongues of the first partial shell 9 formed between the slots 15 can be pressed against the joint ball 1, e.g., via the closing of the ball-and-socket joint housing 4. The ball-and-socket joint housing 4, according to the embodiment, is to be closed by bending its edge area surrounding the joint opening 6 in the direction of the longitudinal axis of the ball-and-socket joint.

Figure 4:
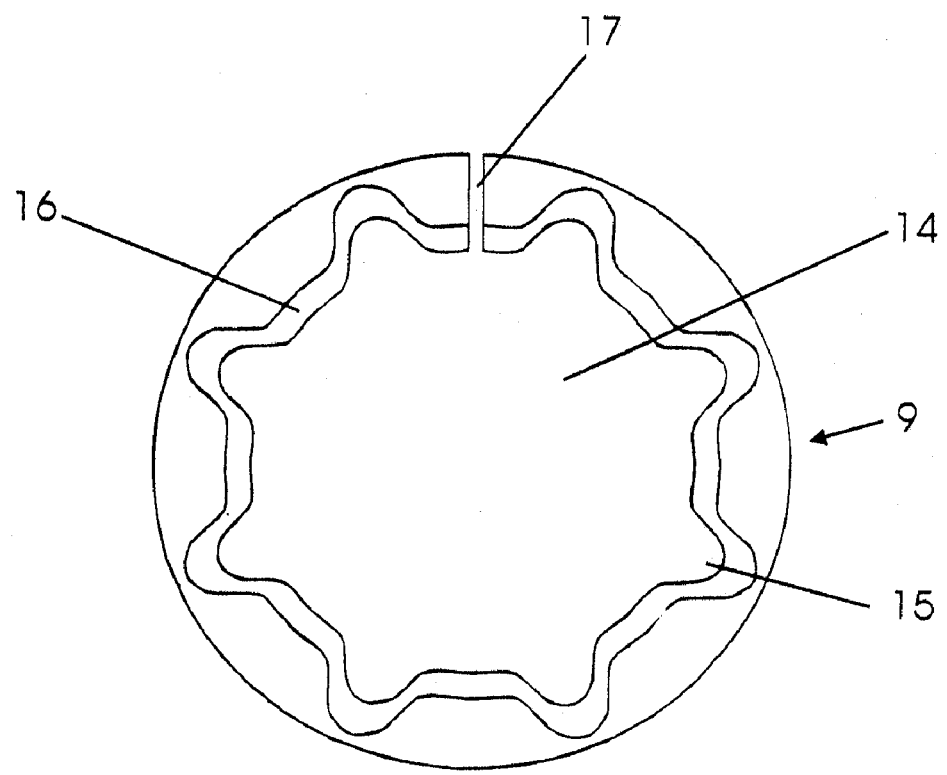
FIG. 4 is a top view of the first partial shell according to FIG. 3.

FIG. 4 shows a top view of the first partial shell 9 according to the first embodiment, in which a longitudinal slot 17, running in the longitudinal direction of the ball-and-socket joint, is provided in the wall 16 of the first partial shell 9. Although the diameter of the joint ball 1 is greater than the diameter of the opening 14, the joint ball 1 can, by providing the longitudinal slot 17, be inserted through the pin opening 14 upon widening slot 17. As a result, a comfortable insertion of the joint ball 1 into the bearing shell 5 is possible during the mounting of the ball-and-socket joint.

Figure 5:
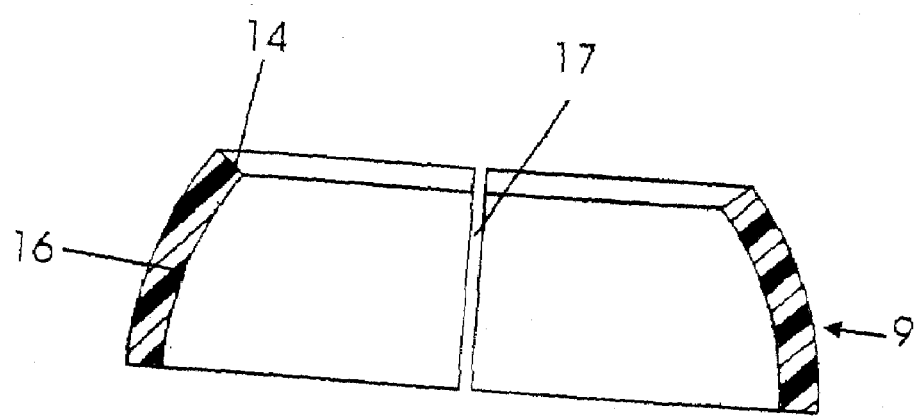
FIG. 5 is a sectional view of a first of the two partial shells according to a second embodiment of the ball-and-socket joint according to the present invention.

FIG. 5 shows a sectional view of a first partial shell 9 according to a second embodiment of the ball-and-socket joint according to the present invention, in which case this first partial shell 9 can be used and be inserted in the same manner as the first partial shell according to the first embodiment. The same reference numbers are used for features of the first partial shell 9 according to the second embodiment, which are identical or similar to features of the first partial shell according to the first embodiment.

In contrast to the first partial shell according to the first embodiment, slots bordered on one side are not provided in the wall 16 of the partial shell 9 according to the second embodiment, which shell also has a bent shape in terms of its cross section. These slots can be omitted, since the first partial shell can be produced with a sufficient accuracy and has a sufficient elasticity in order to be able to compensate for small process tolerances without formation of tears or breakdown. Aside from these slots and the tongues formed between them, the structure of the first partial shell 9 according to the second embodiment is, however, identical to the structure of the first partial shell according to the first embodiment.

Figure 6:
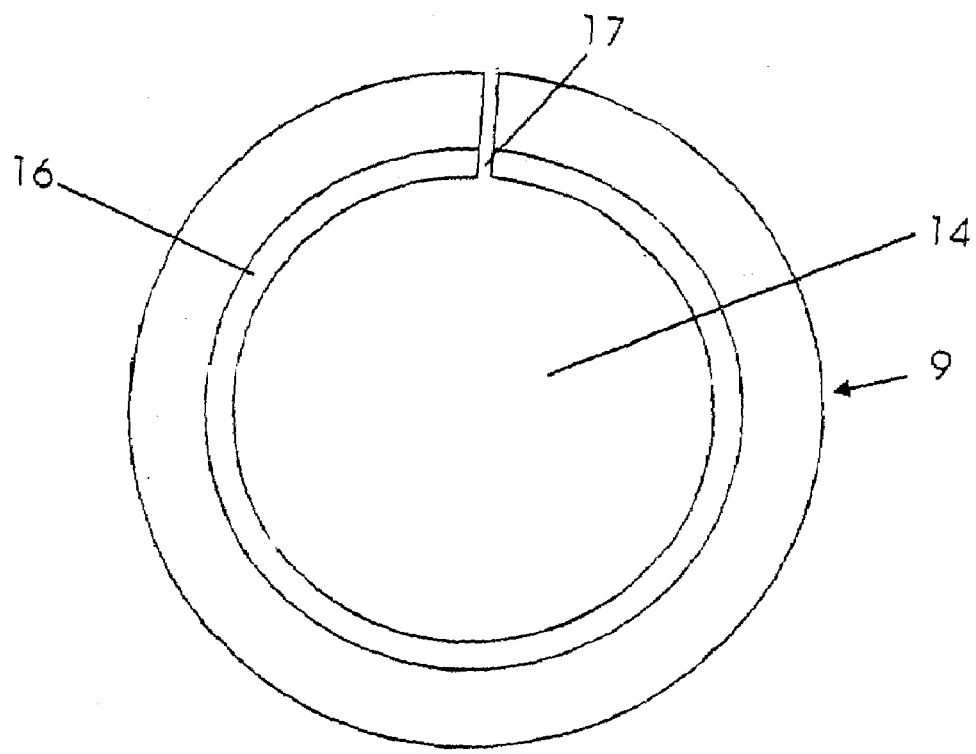
FIG. 6 is a top view of the first partial shell according to FIG. 5.

FIG. 6 shows a top view of the first partial shell 9 according to the second embodiment, in which a longitudinal slot 17 running in the longitudinal direction of the ball-and-socket joint is provided in the wall 16 of the first partial shell 9. This longitudinal slot 17 has the same function as the longitudinal slot in the first partial shell according to the first embodiment.

While specific embodiments of the invention have been shown and described in detail to illustrate the application of the principles of the invention, it will be understood that the invention may be embodied otherwise without departing from such principles.

The invention claimed is:

1. A ball-and-socket joint for a motor vehicle chassis, the ball-and-socket joint comprising:
   a ball-and-socket joint housing provided with a joint opening;
   a bearing shell arranged in said ball-and-socket joint housing;
   a ball pivot having a joint ball and a pin, said joint ball having a joint ball surface, said pin with said joint ball being rotatably and pivotably mounted in said bearing shell with said pin projecting through said bearing shell and said joint opening from said ball-and-socket joint housing, said bearing shell being divided into two separate partial shells and at least one of said partial shells being made of fiber-reinforced plastic and a layer of anti-adhesive material, said anti-adhesive material being added to, and separate from, said fibers and engaging said joint ball surface, wherein said partial shells include:
   a first partial shell arranged between an area of said joint ball facing towards said joint opening and said ball-and-socket joint housing; and
   a second partial shell arranged between the area of said joint ball facing away from said joint opening and said ball-and-socket joint housing wherein said first partial shell is in contact with said second partial shell, whereby said bearing shell continuously engages said joint ball surface.

2. A ball-and-socket joint in accordance with claim 1, wherein said anti-adhesive material is polytetrafluoroethylene.

3. A ball-and-socket joint in accordance with claim 1, wherein said plastic is polyamide.

4. A ball-and-socket joint in accordance with claim 1, wherein said fibers are glass fibers.

5. A ball-and-socket joint in accordance with claim 1, wherein a wall of an edge area of said bearing shell facing towards said pin has a plurality of slots running in a longitudinal direction of said ball-and-socket joint and bordered on one side.

6. A ball-and-socket joint in accordance with claim 1, wherein a lubricant is introduced into said ball-and-socket joint.

7. A ball-and-socket joint in accordance with claim 1, wherein said first partial shell is made of plastic mixed with said anti-adhesive material and reinforced with fibers.

8. A ball-and-socket joint in accordance with claim 1, wherein a continuous slot in a longitudinal direction of said ball-and-socket joint is provided in said wall of said first partial shell.

9. A ball-and-socket joint in accordance with claim 1, wherein said second partial shell is made of a material that is more ductile and more elastic than a material of said first partial shell.

10. A ball-and-socket joint in accordance with claim 1, wherein said second partial shell is made of polyoxymethylene.

11. A ball-and-socket joint in accordance with claim 1, wherein an edge of a first partial shell facing towards said second partial shell has a convex design and said edge of said second partial shell facing towards said first partial shell has a concave design.

12. A joint in accordance with claim 1, wherein:
said anti-adhesive material serves as a spacer between ends of said fibers and said joint ball.

13. A ball-and-socket joint comprising:
a ball-and-socket joint housing having a joint opening;
a bearing shell in said ball-and-socket joint housing, said bearing shell comprising plastic mixed with an anti-adhesive material and reinforced with fibers; and
a ball pivot having a joint ball and a pin, said joint ball being rotatably and pivotably mounted in said bearing shell with said pin projecting through said bearing shell and said joint opening, wherein said bearing shell is divided into two separate partial shells including: a first partial shell arranged between an area of said joint ball facing towards said joint opening and said ball-and-socket joint housing; and a second partial shell arranged between the area of said joint ball facing away from said joint opening and said ball-and-socket joint housing, wherein said first partial shell is made of said plastic mixed with said anti-adhesive material and reinforced with said fibers and said second partial shell is made of a material that is more ductile and more elastic than the mixture of materials with reinforcement of said first partial shell and wherein said first partial shell is in contact with said second partial shell all around said joint ball and said edge of said first partial shell facing towards said second partial shell has a convex design and said edge of said second partial shell facing towards said first partial shell has a concave design.

14. A ball-and-socket joint in accordance with claim 13, wherein said anti-adhesive material is polytetrafluoroethylene, said plastic is polyamide and said fibers are glass fibers.

15. A ball-and-socket joint in accordance with claim 13, wherein a wall of the edge area of said bearing shell facing towards said pin has a plurality of slots running in a longitudinal direction of said ball-and-socket joint and bordered on one side.

16. A joint in accordance with claim 13, wherein:
said anti-adhesive material is arranged, and serves, as a spacer between said ends of said fibers and said joint ball, said anti-adhesive material has lubricating action based on surface-related properties.

17. A ball-and-socket joint comprising:
a housing defining a joint opening;
a bearing shell in said housing, said bearing shell comprising plastic material reinforced with fibers, an anti-adhesive material being added to said plastic material reinforced with fibers;
a ball pivot having a joint ball and a pin, said joint ball being rotatably and pivotably mounted in said bearing shell with said pin projecting through said bearing shell and said joint opening, said anti-adhesive material serving as a spacer between ends of said fibers and said joint ball, wherein:
said bearing shell includes a first partial shell arranged between an area of said joint ball facing towards said joint opening and said housing;
said bearing shell includes a second partial shell arranged between an area of said joint ball facing away from said joint opening and said housing, said second partial shell being made of a material that is more ductile and more elastic than a material of said first partial shell, said first partial shell being in contact with said second partial shell all around said joint ball, an edge of said first partial shell faces towards said second partial shell and has a convex design, an edge of said second partial shell faces towards said first partial shell and has a concave design.

18. A joint in accordance with claim 17, wherein:
said plastic material is one of polyether ether ketone polyether sulfone, polysulfone, polyether imide or polyphenylene sulfide and polyamide;
said anti-adhesive material is produced by using halides;
said fibers are one of light carbon fibers, aramide fibers and glass fibers.

19. A joint in accordance with claim 18, wherein:
said anti-adhesive material is made of fluorine compounds.

20. A joint in accordance with claim 18, wherein:
said anti-adhesive material is one of perfluoroalkoxy copolymer and polytetrafluoroethylene.

21. A joint in accordance with claim 17, wherein:
said first partial shell includes said plastic material reinforced with said fibers and with said anti-adhesive material added to said plastic material reinforced with fibers.

22. A joint in accordance with claim 21, wherein:
said second partial shell is made of polyoxymethylene.

23. A joint in accordance with claim 22, wherein:
said first partial shell is made of polyamide mixed with polytetrafluoroethylene and reinforced with glass fibers.

24. A joint in accordance with claim 23, wherein:
the fiber content in said polyamide is from 20% to 50% and the polytetrafluoroethylene content is from 5% to 20%.

25. A ball-and-socket joint for a motor vehicle chassis, the ball-and-socket joint comprising:
a ball-and-socket joint housing provided with a joint opening;
a bearing shell arranged in said ball-and-socket joint housing;
a ball pivot having a joint ball and a pin, said pin with said joint ball being rotatably and pivotably mounted in said bearing shell with said pin projecting through said bearing shell and said joint opening from said ball-and-socket joint housing, said bearing shell being at least partially made of plastic that is mixed with an anti-adhesive material and reinforced with fibers, said anti-adhesive material being added to, and separate from, said fibers wherein said bearing shell is divided into two separate partial shells including:

a first partial shell arranged between an area of said joint ball facing towards said joint opening and said ball-and-socket joint housing; and a second partial shell arranged between the area of said joint ball facing away from said joint opening and said ball-and-socket joint housing, said first partial shell being in contact with said second partial shell all around said joint ball, wherein an edge of a first partial shell facing towards said second partial shell has a convex design and an edge of said second partial shell facing towards said first partial shell has a concave design.

* * * * *